United States Patent
Lin et al.

(10) Patent No.: US 7,655,575 B2
(45) Date of Patent: Feb. 2, 2010

(54) INN/INP/TIO$_2$ PHOTOSENSITIZED ELECTRODE

(75) Inventors: Ming-Chang Lin, Atlanta, GA (US);
Yen-Chang Tzeng, Yonghe (TW);
Shan-Ming Lan, Daxi Town (TW);
Chi-Shen Lee, Hsinchu (TW);
Tsun-Neng Yang, Taipei (TW);
Tsong-Yang Wei, Taipei (TW);
Jyh-Perng Chiu, Dongshan Shiang (TW); Li-Fu Lin, Taoyuan (TW);
Der-Jhy Shieh, Hsinchu (TW);
Ming-Chao Kuo, Hsinchu (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 574 days.

(21) Appl. No.: 11/586,000

(22) Filed: Oct. 25, 2006

(65) Prior Publication Data

US 2007/0204905 A1 Sep. 6, 2007

(30) Foreign Application Priority Data

Mar. 2, 2006 (TW) .............................. 95107062 A

(51) Int. Cl.
*H01L 21/31* (2006.01)
(52) U.S. Cl. ..................................... 438/765; 438/780
(58) Field of Classification Search ................... 438/42, 438/612, 479, 758, 765, 780; 136/263; 359/900
See application file for complete search history.

(56) References Cited

U.S. PATENT DOCUMENTS

2007/0207561 A1* 9/2007 Lin et al. ....................... 438/42

* cited by examiner

*Primary Examiner*—Jack Dinh

(57) ABSTRACT

The present invention is a photosensitized electrode which absorbs sunlight to obtain electron-hole pair. The photosensitized electrode is fabricated with simple procedure and has low cost. The electrode has excellent chemical resist to be applied in a solar cell device with enhanced sun-light absorbing ability. The present invention can be applied in an optoelectronic device or a hydrogen generator device too.

16 Claims, 8 Drawing Sheets

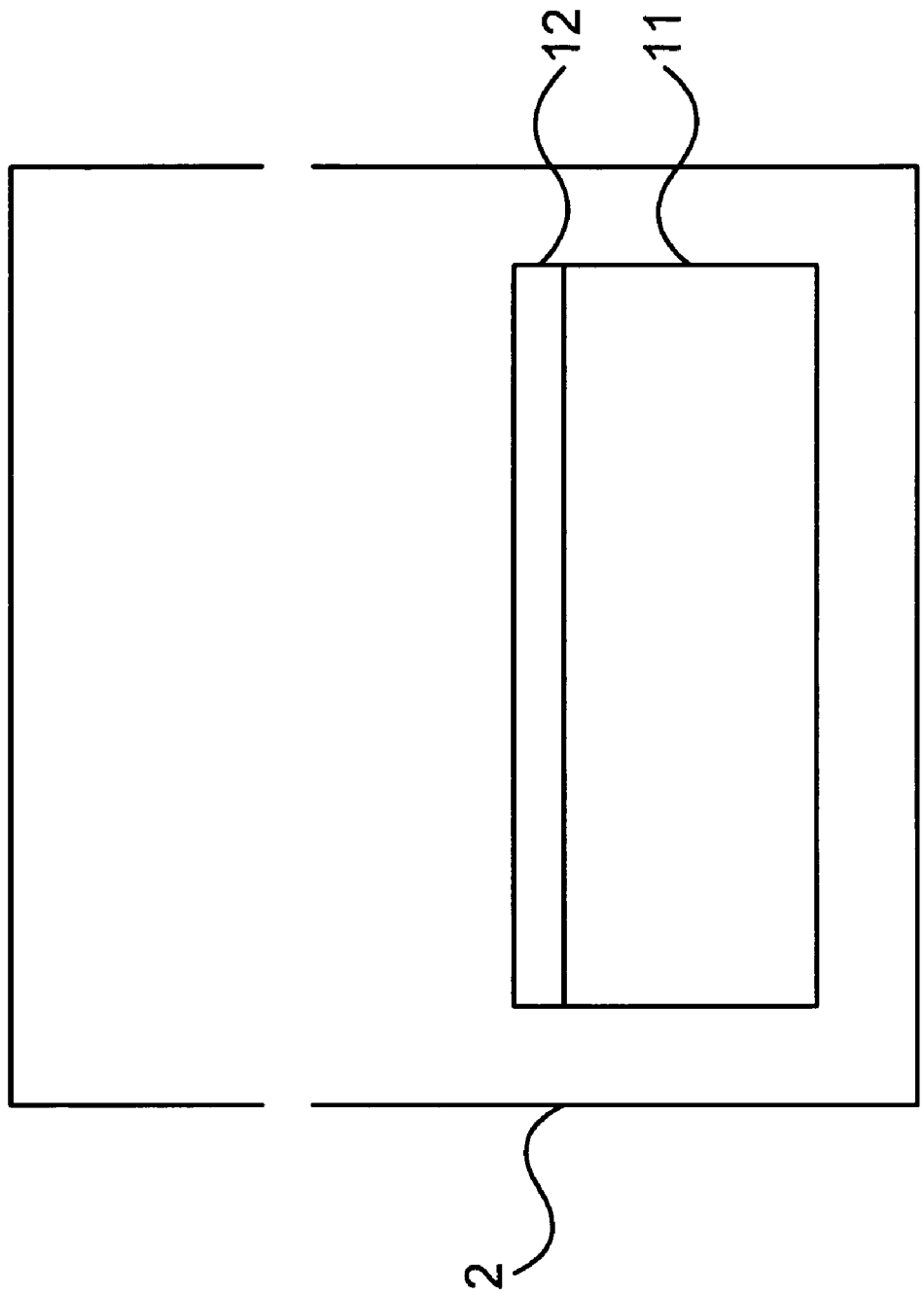

InN/InP/TiO$_2$ PHOTOSENSITIZED ELECTRODE

FIELD OF THE INVENTION

The present invention relates to an photosensitized electrode; more particularly, relates to obtaining a photosensitized electrode having an indium phosphide (InP) photosensitive layer and an indium nitride (InN) photosensitive layer to be applied in a solar cell device, an optoelectronic device and a hydrogen generator device.

DESCRIPTION OF THE RELATED ART

During recent years, a nano-crystal film technology is utilized in a Dye-Sensitized Solar Cell (DSSC) so that the efficiency of photoelectrical transformation has gained a great improvement along with a cheap cost. Hence, the cost for a solar cell may quite possibly drop for about 1/10 to 1/5. The former DSSC basically uses smooth electrode; and its dye molecule layer (such as a ruthenium ligand series, a cyanine, a chlorophyll or a dye derived) transforms electric charge effectively only at a monolayer close to the semiconductor. Because a smooth electrode has small area for absorption with little absorbing ability, its photoelectrical transformation ability is low (less than 1%). Recently, a porous nano-structured electrode is introduced for solving this problem. Because the surface area of the catalyst is thousands times of that of the smooth electrode, the photoelectrical transformation ability is greatly improved. According to Michael Graetzel's research, the photoelectrical transformation efficiency of the DSSC is notably improved to 8%.

The DSSC obviously relies its efficiency on its nanoelectrode structure of titanium oxide (TiO$_2$). Therefore, on fabricating the TiO$_2$, the shape, the arrangement and the interface characteristic of nano-crystal has to be well-controlled. The inner surface area of the TiO$_2$ decides how much dye will be kept; the distribution of the holes affects the spreading of the redox pairs; the distribution of the granular size affects its optical characteristics; and the electron flow determines the connection between the particles. Nowadays, a TiO$_2$ electrode has a electron transferring rate of 10$^{-4}$ cm$^2$/s; so the electrons are easy to be re-combined to the dye for an reaction.

Under a best experimental environment with a best dye, Graetzel, etc. make the transformation efficiency arrive at 10% which is quite close to that of a non-crystal system of 9%-10%; yet still worse than that of the muiti-crystal system of 15%. And, as what is noteworthy, the costs for an organic dye/TiO$_2$ and a multi-crystal system are so high that their costs are still uncompetitive to that of petroleum fuel, like oil or gas.

Although the above DSSC has a great improvement in transformation ability, the cost is high and the fabricating procedure is complex that some elements in the environment has to be controlled, such as the granular size of the TiO$_2$ and the distribution of the particles. Besides, after being shone under the sun for a long time, the material may have a qualitative change to noise its photosensitivity with lifetime shortened. Hence, the prior art does not fulfill users' requests on actual use.

SUMMARY OF THE INVENTION

The main purpose of the present invention is to fabricating a photosensitized electrode with low cost and with long lifetime to be applied in a solar cell device having enhanced absorbing ability.

To achieve the above purpose, the present invention is an InN/InP/TiO$_2$ photosensitized electrode, comprising a substrate, a TiO$_2$ film and a photosensitive layer consisting of an InP photosensitive layer and an InN photosensitive layer, where a fabricating method for the photosensitized electrode comprises placing a substrate, coated with a TiO$_2$ film, in a reaction chamber; pasting the TiO$_2$ film with an InP solution having nanoparticles to obtain an InP photosensitive layer; introducing hydrazoic acid (HN$_3$) and a compound containing indium into the reaction chamber; illuminating the InP photosensitive layer with an ultraviolet light; and obtaining an InN photosensitive layer on the InP photosensitive layer. Accordingly, a novel InN/InP/TiO$_2$ photosensitized electrode is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is a structural view showing a preferred embodiment according to the present invention;

FIGS. 2A, FIG. 2B, FIG. 2C, FIG. 2D and FIG. 2E are views showing step (a), step (b), step (c), step (d), and step (e) of the fabricating of the photosensitized electrode respectively.

DESCRIPTION OF THE PREFERRED EMBODIMENT

The following description of the preferred embodiment is provided to understand the features and the structures of the present invention.

Figure 1:
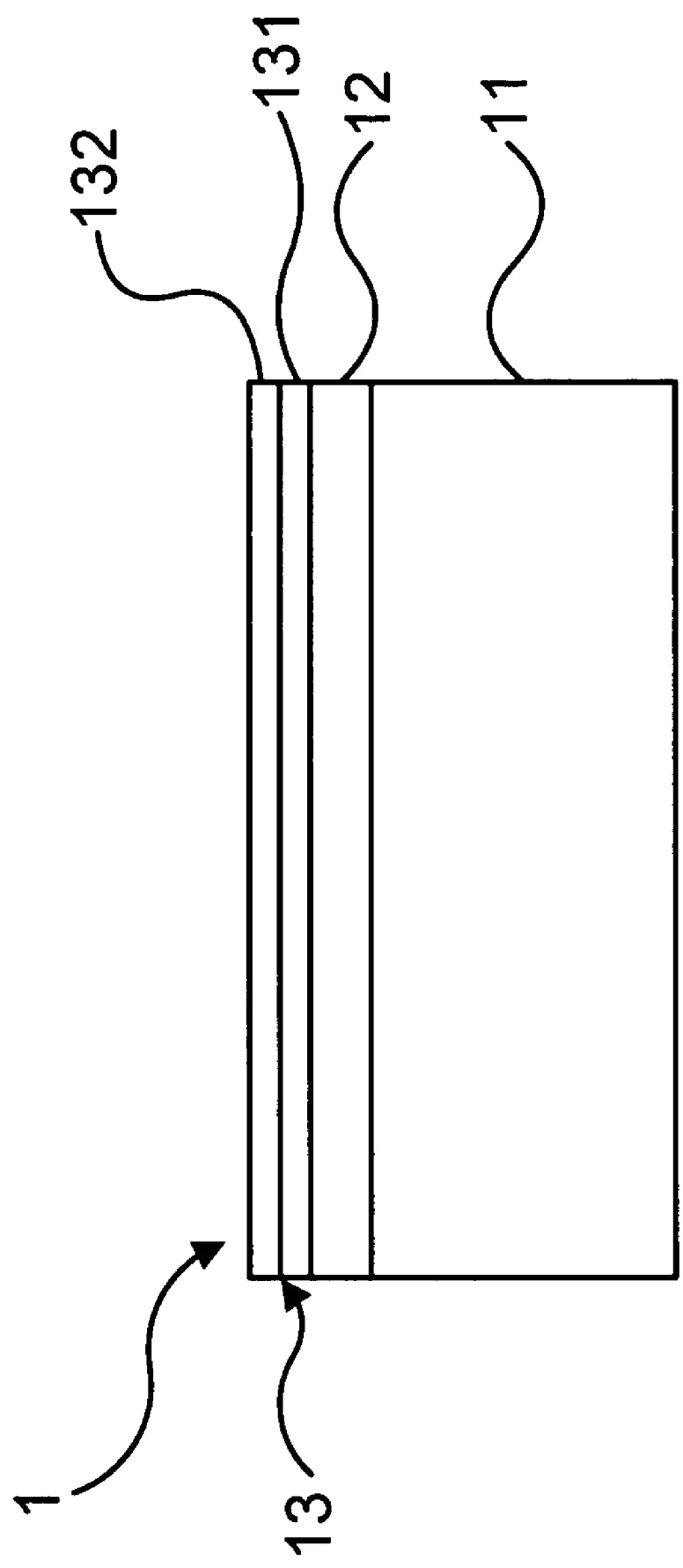

Please refer to FIG. 1, which is a structural view showing a preferred embodiment according to the present invention. As shown in the figure, the present invention is an InN (indium nitride)/InP(indium phosphide)/TiO$_2$ (titanium oxide) photosensitized electrode 1, comprising a substrate 11, a TiO$_2$ film 12 and a photosensitive layer 13.

The substrate 11 is an indium tin oxide (ITO) glass, an fluorine tin oxide (FTO) glass or other transparent conductive substrate.

The TiO$_2$ film 12 is covered on the substrate 11. The TiO$_2$ film 12 has a nanoparticle structure, where a plurality of nanoparticles are evenly distributed in the TiO$_2$ film 12, and where each nanoparticle has a diameter between 7 nm (nanometer) and 50 nm. The TiO$_2$ film 12 has a thickness between 100 nm and 100000 nm and is made of a metal oxide having a high band-gap.

The photosensitive layer 13 comprises an InP photosensitive layer 131 and an InN photosensitive layer 132. The InP photosensitive layer 131 and the InN photosensitive layer 132 are made through a chemical vapor deposition (CVD), a physical vapor deposition (PVD) or other epitaxial film growth method. The InP photosensitive layer 131 is coated on the TiO$_2$ film 12 and the InN photosensitive layer 132 is coated on the InP photosensitive layer 131. The InP photosensitive layer 131 and the InN photosensitive layer 132 both have a thickness between 1 nm and 10000 nm. Thus, with the above structure, a novel photosensitized electrode is obtained.

When a light penetrates through the substrate 11 of the photosensitized electrode 1 into the photosensitive layer 13, an electron is injected into the TiO$_2$ film 12 from the photosensitive layer 13 and then the electron is conducted to an outside circuit from the substrate, where the photosensitive layer 13 absorbs an optical wavelength between 390 nm and 600 nm and an optical bandwidth between 390 nm and 800 nm.

Figure 2:
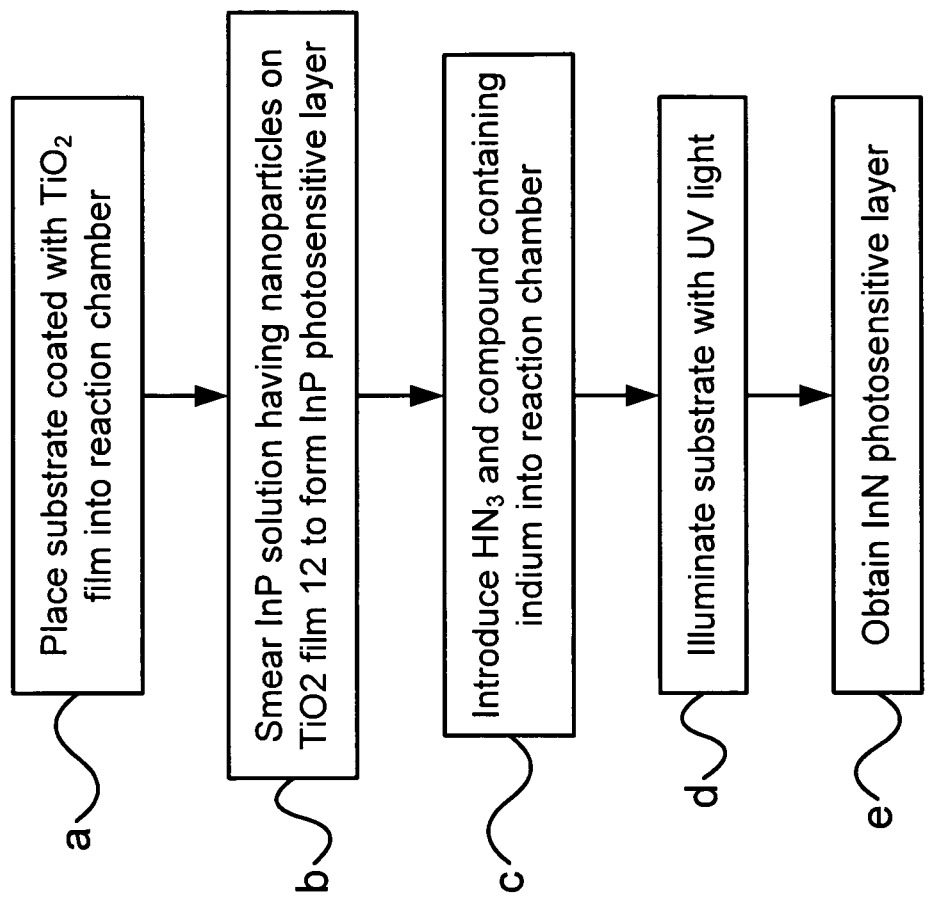
FIG. 2 is a flow view showing the fabricating of the photosensitized electrode.
Figure 2B:
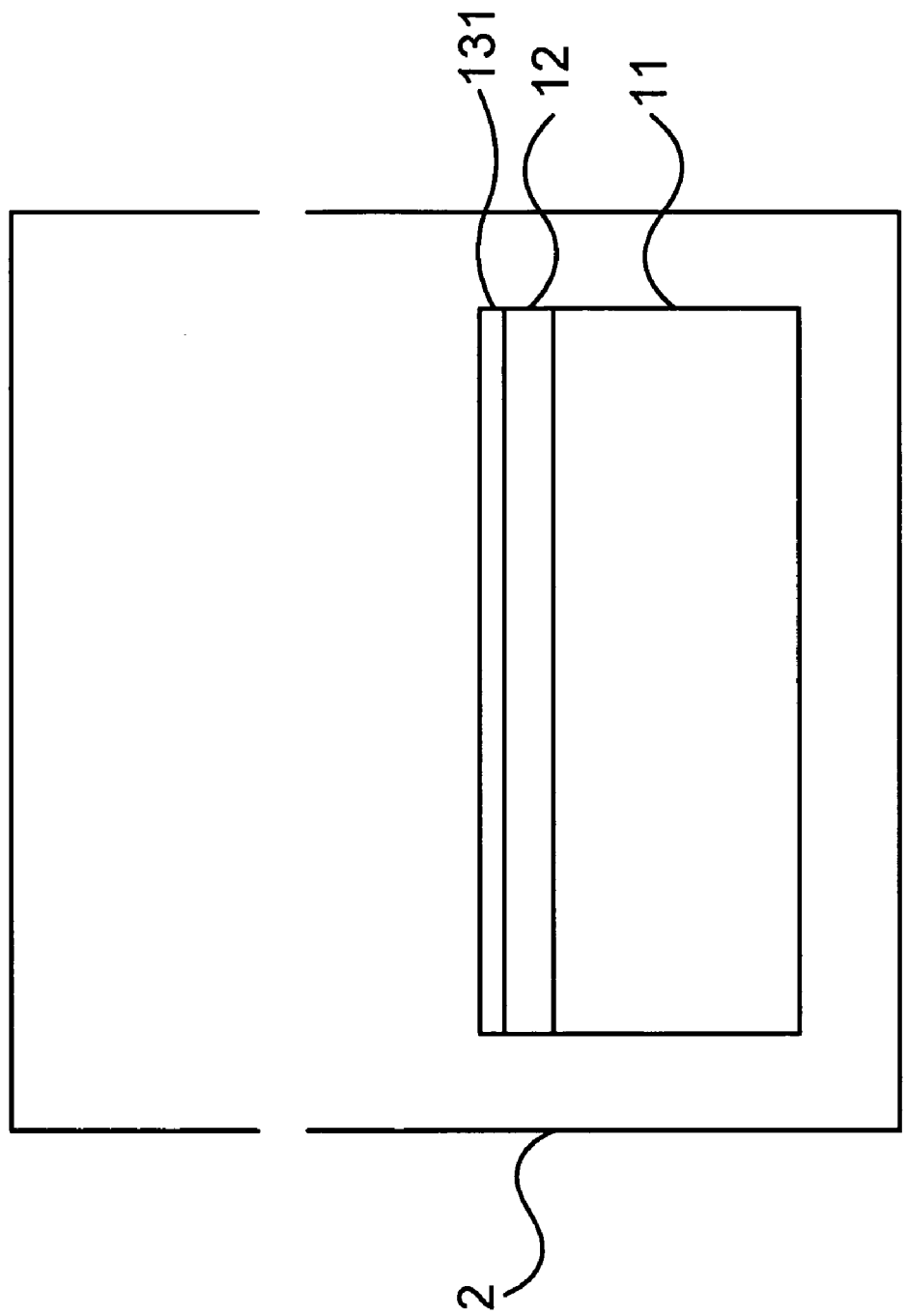
Figure 2C:
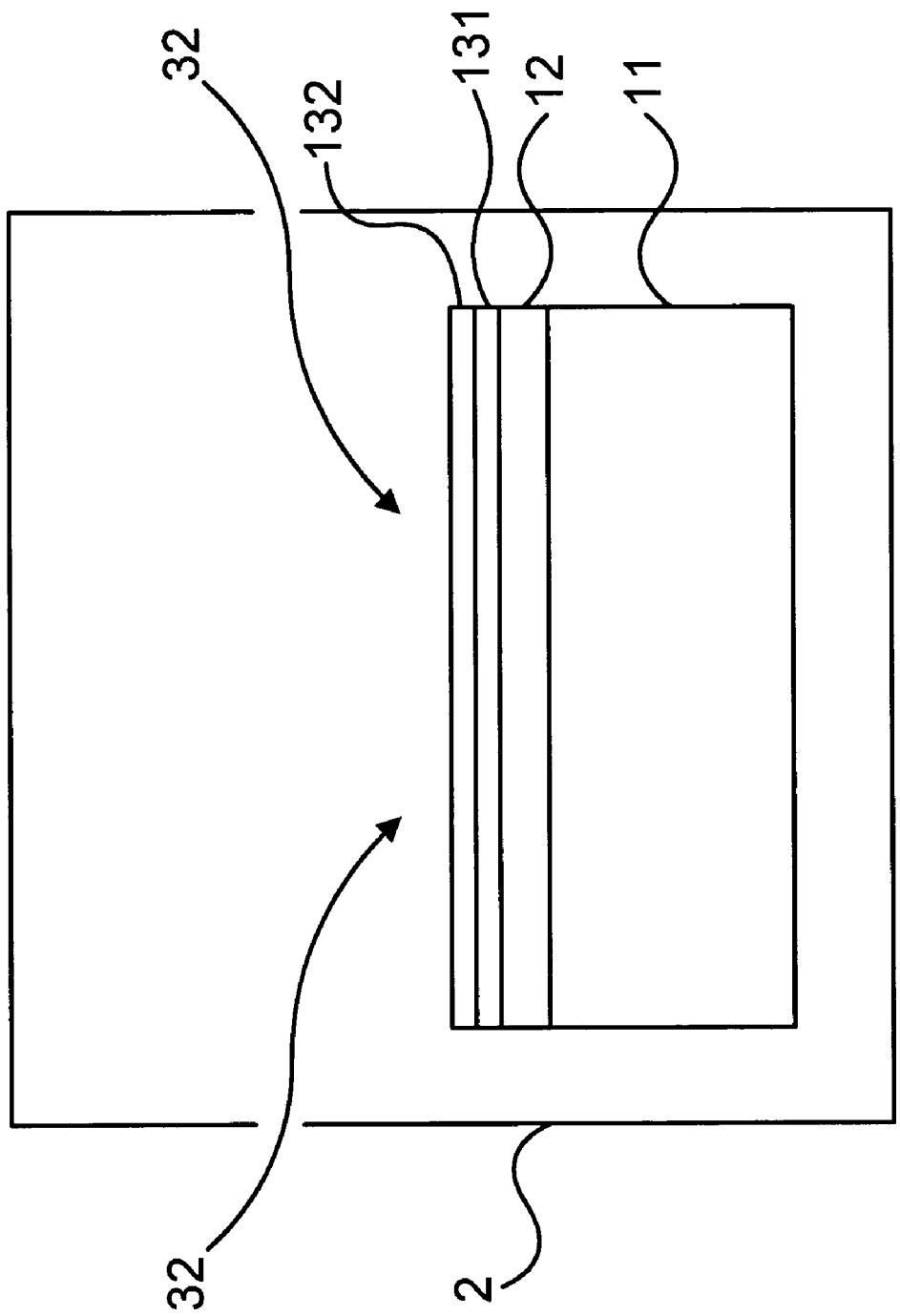
Figure 2D:
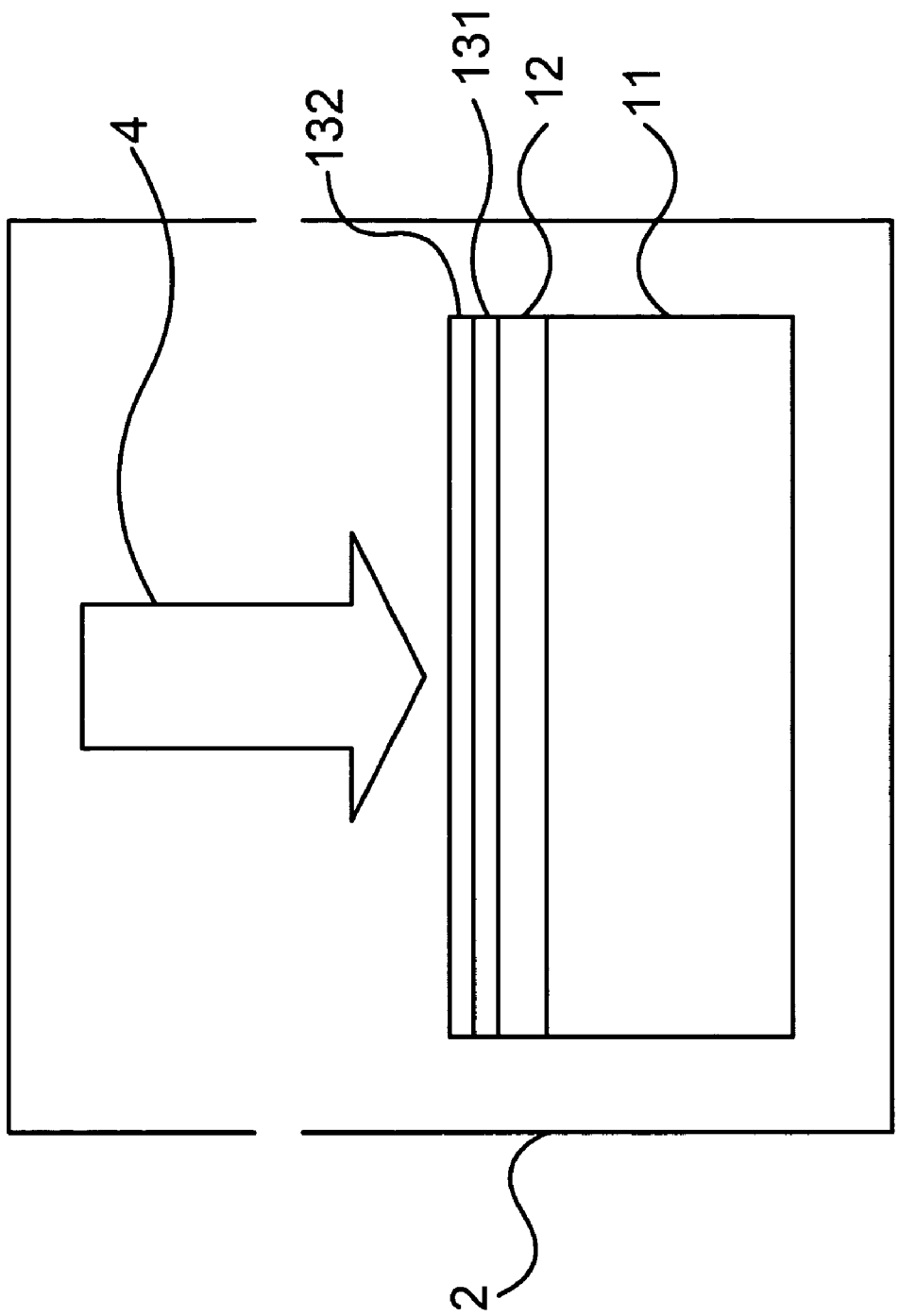
Figure 2E:
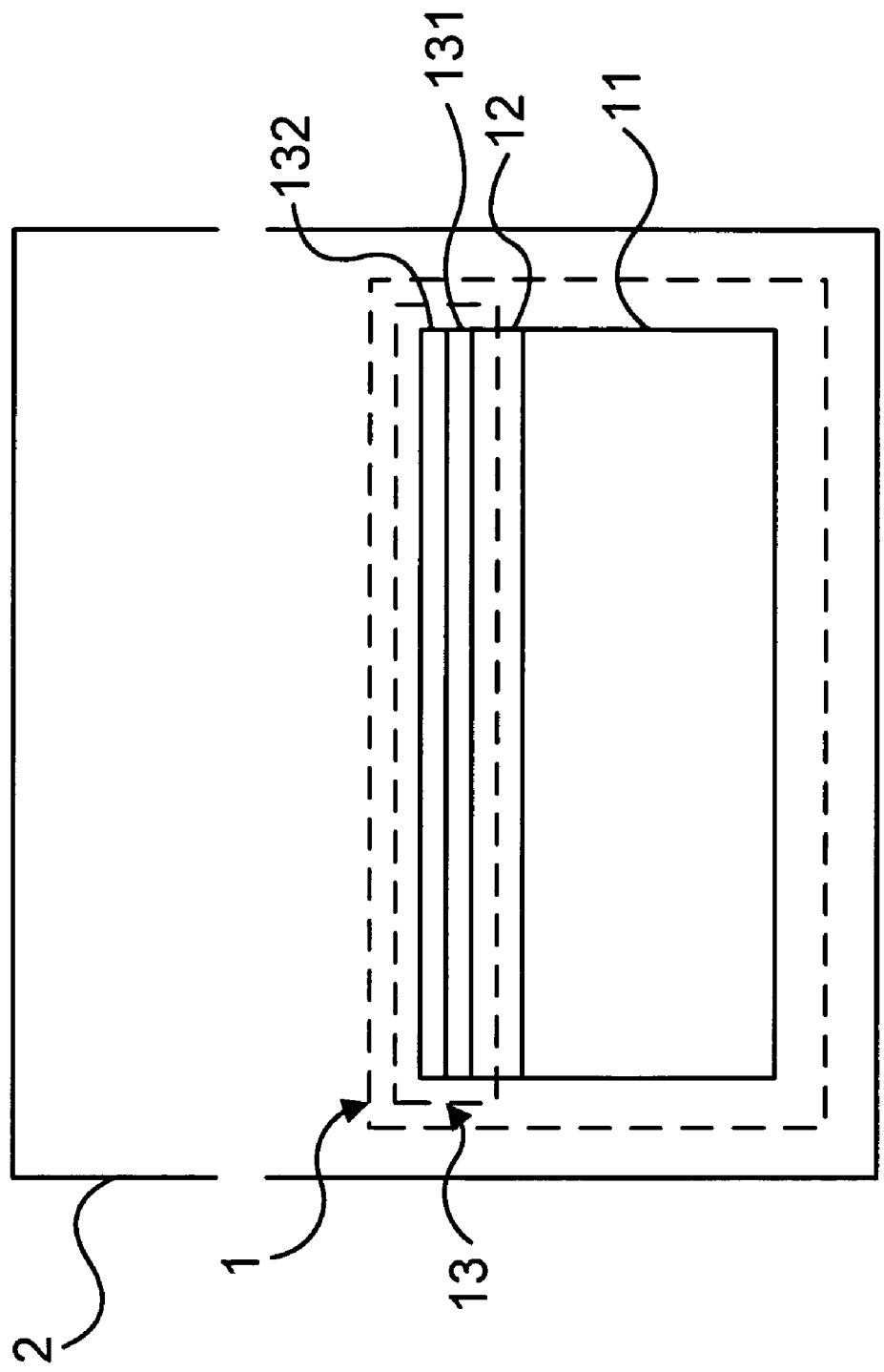

Please refer to FIG. 2 and FIG. 2A until FIG. 2E, which are a flow view showing the fabricating of the photosensitized electrode and views showing step (a) until step (e) of the fabricating of the photosensitized electrode. As shown in the figures, the fabricating of the photosensitized electrode according to the present invention comprises the following steps:

Step (a): A substrate 11 coated with a TiO$_2$ film 12 is placed into a reaction chamber 2, where the TiO$_2$ film 12 is coated on the substrate 11 through a CVD or a PCD.

Step (b): An InP solution having nanoparticles is pasted on the TiO$_2$ film 12 to form an InP photosensitive layer 131, where the InP solution has nanoparticles and can be replaced with a compound containing phosphorus and a compound containing indium.

Step (c): A hydrazoic acid (HN$_3$) 31 and a compound containing indium 32 is introduced into the reaction chamber 2, where the ratio of HN$_3$ 31 to the compound containing indium 32 is between 1 and 10. The compound containing indium 32 is a trimethylindium, a triethylindium, a indium-containing metallo-organic precursor or a combination of indium-containing metallo-organic precursors. The present invention uses the HN$_3$ 31 and the compound containing indium 32 as precursors; and the HN$_3$ 31 can be replaced with a compound containing nitrogen.

Step (d): The substrate 11 is then illuminated with an ultraviolet (UV) light, where the UV light is obtained from a continuous UV lamp, an excimer laser, a semiconductor laser, a gas laser, a solid-state laser, a liquid laser, a chemical laser or a free-electron laser, and where the TiO$_2$ film 12 bears a temperature between 600° C. (Celsius degree) and 900° C.

Step (e): An InN photosensitive layer 132 is obtained on the InP photosensitive layer 131 so that the InP photosensitive layer 131 and the InN photosensitive layer 132 are obtained to form a photosensitive layer 13. Thus, a photosensitized electrode 13 is obtained, where the total process time is between 1 hr and 8 hr.

Figure 3:
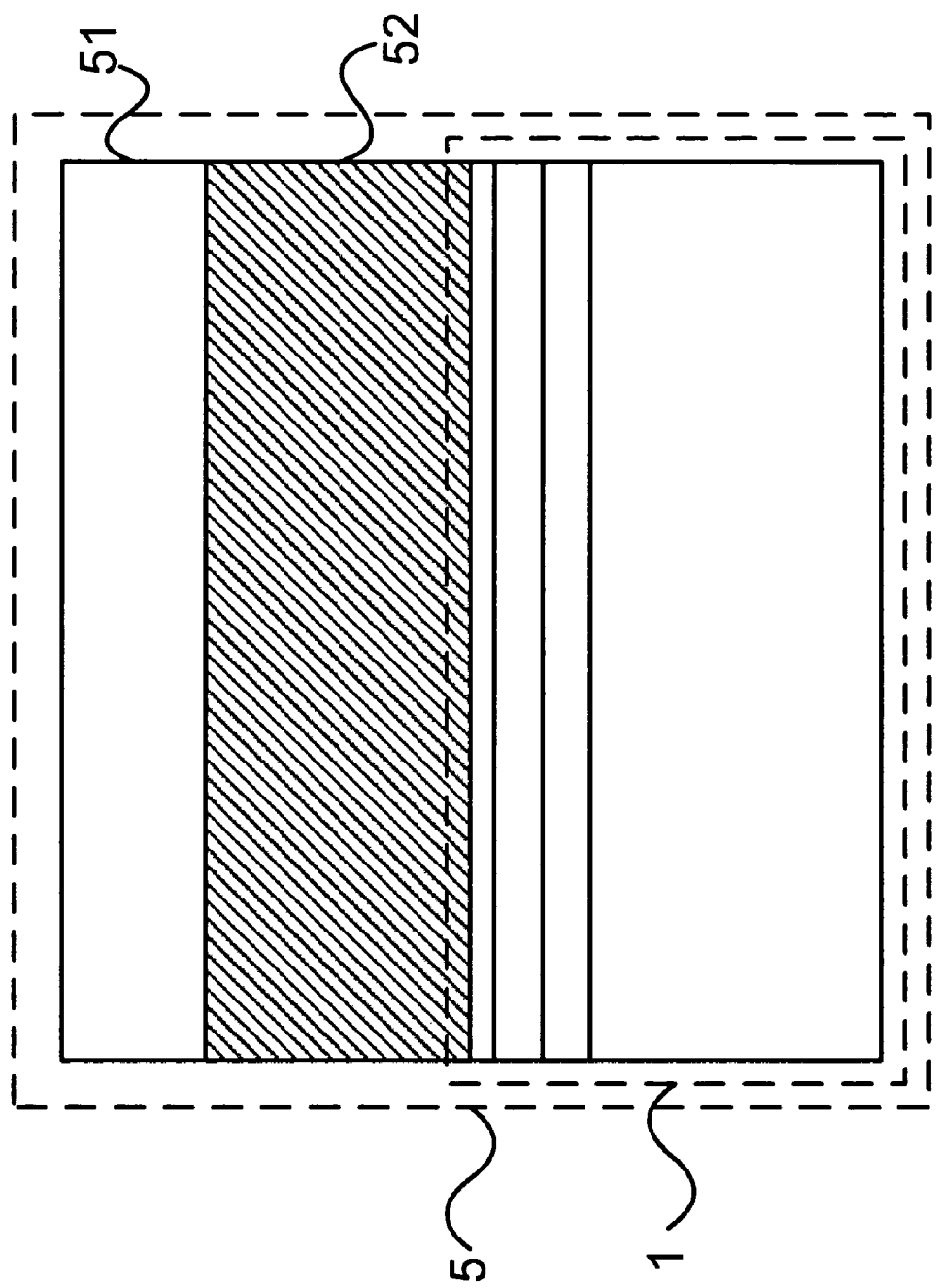
FIG. 3 is a view showing a state of use of the electrode.

Please refer to FIG. 3, which is a view showing a state of use of the electrode. As shown in the figure, the photosensitized electrode 1 according to the present invention is assembled with a platinum counter electrode 51 to form a solar cell device filled with an electrolyte 52 inside. The present invention can be applied to a solar cell device, a photovoltaic device, a hydrogen generation devices and an optoelectronic device.

To sum up, the present invention is a InN/InP/TiO$_2$ photosensitized electrode, where a lifetime issue of the dye for a Dye-Sensitized Solar Cell (DSSC) is solved; an optical absorption efficiency is enhanced; a production procedure is simplified; and a production cost is reduced.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An InN (indium nitride)/InP(indium phosphide)/TiO$_2$ (titanium oxide) photosensitized electrode, comprising:
   a substrate;
   a TiO$_2$ film, said TiO$_2$ film covering on said substrate; and
   a photosensitive layer, said photosensitive layer comprising an InP photosensitive layer and an InN photosensitive layer, said InP photosensitive layer coating on said TiO$_2$ film, said InN photosensitive layer coating on said InP photosensitive layer.

2. The photosensitized electrode according to claim 1, wherein said substrate is a transparent conductive substrate selected from a group consisting of an indium tin oxide (ITO) glass and an fluorine tin oxide (FTO) glass.

3. The photosensitized electrode according to claim 1, wherein said TiO$_2$ film has a nanoparticle structure.

4. The photosensitized electrode according to claim 3, wherein said nanoparticle has a diameter between 7 nm (nanometer) and 50 nm.

5. The photosensitized electrode according to claim 1, wherein said TiO$_2$ film has a thickness between 100 nm and 100000 nm.

6. The photosensitized electrode according to claim 1, wherein said InP photosensitive layer has a thickness between 1 nm and 10000 nm.

7. The photosensitized electrode according to claim 1, wherein said InN photosensitive layer has a thickness between 1 nm and 10000 nm.

8. The photosensitized electrode according to claim 1, wherein said photosensitive layer absorbs light having a wavelength between 390 nm and 600 nm.

9. The photosensitized electrode according to claim 1, wherein said photosensitive layer absorbs light having an optical bandwidth between 390 nm and 800 nm.

10. The photosensitized electrode according to claim 1, said photosensitized electrode having a fabrication method comprising steps of:
    a. placing a substrate in a reaction chamber, said substrate coated with a TiO$_2$ film;
    b. pasting said TiO$_2$ film with an InP solution having nanoparticles to obtain an InP photosensitive layer;
    c. introducing hydrazoic acid (HN$_3$) and a compound containing indium into said reaction chamber;
    d. illuminating said InP photosensitive layer with an ultra violet (UV) light; and
    e. obtaining an InN photosensitive layer coated on said InP photosensitive layer.

11. The method according to claim 10, wherein said compound containing indium is selected from a group consisting of a trimethylindium, a triethylindium, a indium-containing metallo-organic precursor and a combination of indium-containing metallo-organic precursors.

12. The method according to claim 10, wherein said hydrazoic acid is a compound containing indium.

13. The method according to claim 10, wherein a ratio of said HN3 to said compound containing indium is between 1 and 10.

14. The method according to claim 10, wherein said TiO$_2$ film bears a temperature between 600° C. (Celsius degrees) and 900° C.

15. The method according to claim 10, wherein a period of time for processing all steps of said step (a) until step (e) is between 1 hr (hour) and 8 hr.

16. The method according to claim 10, wherein said UV light is obtained from a light source selected from a group consisting of a continuous UV lamp, an excimer laser, a semiconductor laser, a gas laser, a solid-state laser, a liquid laser, a chemical laser and a free-electron laser.

* * * * *